United States Patent Office 2,797,166
Patented June 25, 1957

2,797,166

DEHYDRATION OF POTATOES BY USE OF BRINE

James Siciliano, Woodbury, N. J., and Edward G. Heisler, Plymouth Meeting, and Robert H. Treadway, Philadelphia, Pa., assignors to the United States of America as represented by the Secretary of Agriculture No Drawing. Application January 26, 1954,
Serial No. 406,367

2 Claims. (Cl. 99—207)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to the partial dehydration of raw potatoes by soaking them in a salt solution.

Raw potatoes contain about 80 percent of water, the presence of which makes handling and shipping expensive and favors decomposition in storage. Completely dehydrated potatoes are stable in storage and light in weight. However, no completely satisfactory method of dehydration has ever been found, despite extensive research. All the methods known to the prior art are too expensive or they damage the product so that the rehydrated potato is of inferior quality.

Salt (sodium chloride) and salt solutions (brine) have been used to withdraw water from many substances to yield a partially dehydrated product which could then be used as such or could be further dehydrated by other methods.

Theory predicts, and prior art experience teaches, that in the use of brine to extract water from a plant tissue, such as potatoes, the more concentrated the brine and the longer the soaking period the more water is removed from the tissue.

The object of this invention is to provide an improved process for the partial dehydration of raw potatoes by soaking in brine.

According to the invention, the maximum amount of water is removed from the raw potatoes by soaking the potatoes in a dilute brine for an optimum period. This is effected by immersing the raw potato, the smallest dimension of which does not exceed about ¼ inch, in aqueous brine of at least about 2% concentration, preferably about 3% concentration, for at least about 2 hours, preferably for about from 5 to 7 hours, at a temperature up to about 35° C., preferably from about 25° C. to 35° C., to remove about from 21% to 28% of the moisture from the potato. The use of highly concentrated brine, even to the point of saturation, or the use of periods of time exceeding about 7 hours result in the removal of a lower percentage of the water present in the potato.

To determine the effect of varying the concentration of salt on the maximum amount of water removed and the time required to reach that maximum, a series of experiments were run in which raw potato slices ¼ inch thick were soaked in brine at room temperature (25° C.). The results are shown in Table I.

*Table I.—Effect of concentration of sodium chloride solution on dehydration of raw potato*

| Conc. of Brine, percent | Max. Water Removed, Percent of Total | Time, Hrs. |
|---|---|---|
| 1 | 0 | |
| 2 | 24 | 7 |
| 3 | 28 | 7 |
| 4 | 27 | 5 |
| 5 | 26 | 4 |
| 10 | 22 | 3 |
| 15 | 22 | 2 |
| 20 | 21 | 2 |
| 25 | 22 | 2 |
| 35 | 24 | 2 |

From the above data it may be seen that the maximum water removed was effected by use of 3 percent brine, and 7 hours was required to reach that maximum. In these experiments, the amount of water removed increased with time of soaking until the maximum was reached in the time shown. Further soaking resulted not merely in cessation of dehydration but in more or less rehydration.

While the use of 3 percent brine resulted in maximum dehydration, it should be noticed that use of 4 or 5 percent brine achieved almost as much dehydration and did so in considerably less time. Because of this saving of time, and because the brine becomes diluted with use, we generally prefer to put the brine into the process at about 5 percent concentration and withdraw it at about 3 percent. Alternatively, we may add salt to the brine as needed to maintain it at substantially a constant concentration.

It is readily apparent that the process may be operated in a batchwise, semi-continuous or continuous manner without departing from the basic principle of the invention.

It has been found that the rate of dehydration is affected by changes in temperature. Increasing the temperature increases the rate of dehydration until about 35° C. is reached. Above this point the potato starch granules begin to swell, thus impeding the dehydration. This effect is illustrated by the data in Table II. In these experiments ¼ inch slices of potato were immersed in 3 percent brine until maximum dehydration had been achieved.

*Table II.—Effect of temperature on dehydration*

| Temp., °C. | Max. Water Removed, Percent of Total | Time, Hrs. |
|---|---|---|
| 25 | 28 | 7 |
| 30 | 25 | 6 |
| 35 | 27 | 5 |
| 38 | 18 | 4 |
| 45 | 20 | 6 |
| 50 | 20 | 3 |

From these data it can be seen that there is little difference in the maximum water removed in the range 25–35° but at higher temperatures there is a sharp drop in water removed. However, the rate of water removal increases with temperature; hence it is advantageous to operate at a temperature up to about 35° in order to increase through-put without seriously reducing the amount of water removed.

The physical form of the potatoes is not important except that very thick sections should be avoided because of their slow rate of dehydration. Thus, when sliced potatoes are dehydrated by use of 3 percent brine at 25° C. the time required for maximum water removal varies with the thickness of the slices. Three-quarter inch slices required 20 hours, ¼ inch slices required 7 hours, while 0.04 inch slices required 5 hours. From these data it is apparent that little saving in time can be expected from use of slices less than ¼ inch in thickness. On the other hand, whole potatoes or very thick slices require an excessive time for dehydration. As a practical matter, we generally prefer diced or sliced potato having the smallest dimension about ¼ inch or less.

Potatoes that are to be fried as chips, julienne strips, or french-fries should be cut into the proper form for frying before being soaked in brine. Partial dehydration of such raw potatoes by our process is highly advantageous in that less time is required for frying and in the case of chips the product is less subject to crumbling in packaging and handling than are conventional chips.

The process of this invention is particularly useful in the manufacture of potato granules, a cooked, dehydrated potato product in which the cells are mostly intact and which is readily reconstituted to mashed potatoes for table use.

In the conventional processes for making granules it is necessary in the dehydration step to recycle a large part of the product by mixing with the fresh mashed potato in order to get a material that will go through the drying step without excessive lumping. By first subjecting the raw potato to our partial dehydration process the moisture content can be reduced so far that the proportion of dry product required for recycling can be drastically reduced, thus greatly increasing the capacity of the drier as well as improving the quality of the product.

We claim:

1. A process for partially dehydrating raw potato comprising immersing raw potato, the smallest dimension of which does not exceed about ¼ inch, in aqueous brine of at least about 2% concentration for at least about 2 hours at a temperature up to about 35° C. to remove about from 21% to 28% of the moisture therefrom.

2. A process for partially dehydrating raw potato comprising immersing raw potato, the smallest dimension of which does not exceed about ¼ inch, in aqueous brine of about 3% concentration for about from 5 to 7 hours at a temperature of about from 25° C. to 35° C. to remove about from 25% to 28% of the moisture therefrom.

References Cited in the file of this patent

UNITED STATES PATENTS

| | | |
|---|---|---|
| 1,259,635 | King | Mar. 19, 1918 |
| 2,190,063 | Gano | Feb. 13, 1940 |
| 2,681,285 | Hendel et al. | June 15, 1954 |